United States Patent [19]
Tsumura

[11] Patent Number: 5,848,162
[45] Date of Patent: Dec. 8, 1998

[54] DATA ACQUIRING APPARATUS

[75] Inventor: Tomoki Tsumura, Yokohama, Japan

[73] Assignee: Matsushita Electric Industrial Co., Ltd., Osaka, Japan

[21] Appl. No.: 753,196

[22] Filed: Nov. 21, 1996

[30] Foreign Application Priority Data

Nov. 24, 1995 [JP] Japan .................................. 7-306253

[51] Int. Cl.⁶ .................................................. H04K 1/00
[52] U.S. Cl. .................................................. 380/49; 380/4
[58] Field of Search ................................. 380/49, 4, 23, 380/25

[56] References Cited

U.S. PATENT DOCUMENTS 5,253,296 10/1993 Castleberry et al. ...................... 380/49
5,305,385 4/1994 Schanning et al. ....................... 380/49

*Primary Examiner*—David Cain
*Attorney, Agent, or Firm*—Lowe Hauptman Gopstein Gilman & Berner

[57] ABSTRACT

A data acquiring apparatus is disclosed. A comm control portion (1), coupled to a network (N), controls comm with the network; a mail box portion (2) stores at least a block of data (13) from N. An enciphering portion (5) enciphers the block of data from the mail box. A mail box control portion (3) displays a portion of the block of data from the mail box portion on the display in response to a 1st request (8d) via an input portion, controls the mail box, supplies the block of data to the enciphering portion in response to a 2nd request (8e) from the input portion, and operates the enciphering portion to encipher the block of data from the mail block. A filing unit (4) stores the block of data from the enciphering portion. A decoding portion (7) decodes and displays the block of data from the filing unit on the display portion in response to a 3rd request (8f) from the input portion to provide the decoded block of data to a user. The supplied block of data is subjected to an enciphering processing different every user, so that another person cannot utilize the enciphered data, though the storing medium (4a) in the filing unit is removable. On utilizing or erasing data, the notice is transmitted to a data supplier. The distributed data includes the open data portion 11, so that the users can readily know the content of the data.

15 Claims, 2 Drawing Sheets

DATA ACQUIRING APPARATUS

BACKGROUND OF THE INVENTION

1. Field of the Invention

This invention relates to a data acquiring apparatus for acquiring data transmitted from a data supplier.

2. Description of the Prior Art

A data acquiring apparatus for acquiring data from a data supplier, wherein data is supplied after a contraction with a periodically accounting is known. For example, a user applies to a data supplier for utilizing a data service and contracts with the data supplier. The data supplier supplies data after or before accounting.

SUMMARY OF THE INVENTION

The present invention has been developed in order to provide an improved data acquiring apparatus.

According to this invention, a data acquiring apparatus is provided, which comprises: a display; an input portion; a communication control portion, coupled to a network, for controlling communication with the network; a mail box portion for storing at least a block of data from the network via the communication control portion; an enciphering portion for enciphering the block of data from the mail box; a mail box control portion for displaying a portion of the block of data from the mail box portion on the display in response to a first request via the input portion, for controlling the mail box, supplying the block of data to the enciphering portion in response to a second request from the input portion and operating the enciphering portion to encipher the block of data from the mail block; a filing unit responsive to the enciphering portion for storing the block of data from the enciphering portion; and a decoding portion for decoding and displaying the block of data from the filing portion on the display portion in response to a third request from the input portion to provide the decoded block of data to a user.

In this data acquiring apparatus, the portion of block of data includes a title portion and an open data portion, the remaining portion of the block of data includes a data body to be provided to the user and a control data portion, the title portion represents a title of the data body, the open data portion includes information relating to the data body, and the mail box control portion controls the mail box portion in accordance with the control data portion. In this case, the mail box control portion is inhibited from accessing to the data body and only the decoding portion is permitted to access to the data body of the block of data in the filing unit.

This data acquiring apparatus may further comprise a data scraping portion for scraping the block of data in the mail box, the mail box control portion operates the data scraping portion to scrap the block of data in the mail box in response to a fourth request and generating and transmitting a notice indicating that the block of data in the mail box has been scraped to a data supplier which transmitted the block of data.

This data acquiring apparatus may further comprise a data scraping portion for scraping the block of data in the filing unit, the decoding portion operates the data scraping portion to scraping the block of data in the filing unit in response to a fourth request, and the decoding portion generates and transmits a notice indicating that the block of data in the filing unit has been scraped to a data supplier which transmitted the block of data in response to the fourth request. In this case, the data scraping portion stores predetermined data over the block of data in the filing unit to scrap the data of block in order to prevent the block of data from being utilized again and the data decoding portion transmits the notice when the data scraping portion has stored the predetermined data over the block of data in the filing unit. Moreover, the decoding portion generates record data indicating that the block of data in the filing unit has been scraped and informs of the record data to a data supplier which transmitted the block of data via the network in response to a sixth request from the data supplier.

In the data acquiring apparatus, the enciphering portion enciphers the block of data through an enciphering processing which is determined in accordance with key data and identification data of the user inputted from the input portion to prevent the block of data from being utilized by another person.

In the data acquiring apparatus, the enciphering portion generates and transmits a notice indicating that the block of data has stored in the filing unit to a data supplier, which transmitted the block of data, when the enciphering portion enciphers the block of data.

In the data acquiring apparatus, the decoding portion decodes the block of data from the filing unit through a decoding processing which is determined in accordance with second key data and second identification data inputted from the input portion and the decoding processing is an inversion of the enciphering processing when the key data and the identification data agree with the second key data and second identification data respectively.

In the data acquiring apparatus, the decoding portion displays the decoded block of data on the display and generates and transmits a notice indicating that the block of data from the filing unit is utilized to a data supplier, which transmitted the block of data, when the decoding portion decodes the block of data.

In the data acquiring apparatus, the decoding portion displays the decoded block of data on the display and generates and stores historic data indicating that the block of data in the filing unit is utilized in the filing unit with a relation to the block of data in the filing unit when the decoding portion decodes the block of data. In this case, the decoding portion reads and transmits the historic data from the filing unit to a data supplier which transmitted the block of data via the network in response to a request from the data supplier via the network and the communication control portion.

In the data acquiring apparatus, the filing unit comprises a storing portion for storing the block of data from the enciphering portion on a removable recording medium and a reading portion for reading the block of data from the removable recording medium.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
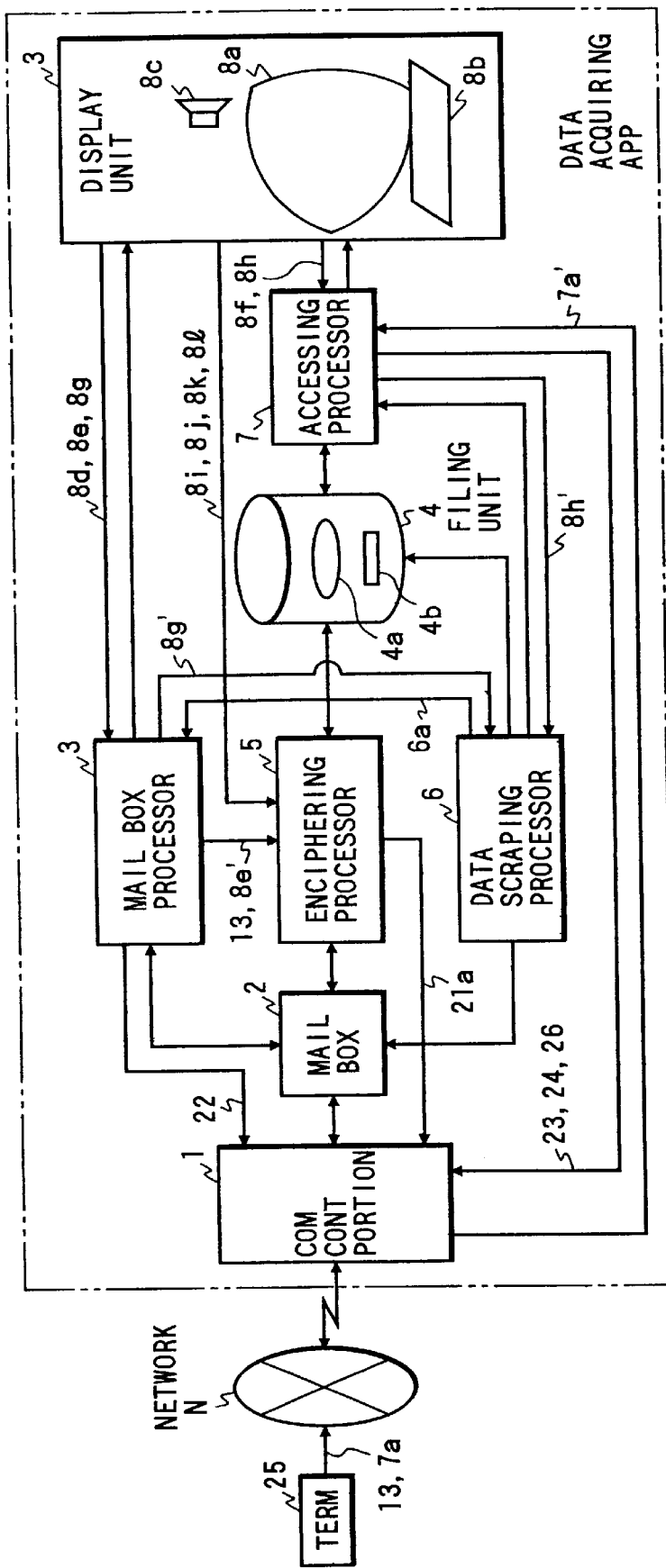
FIG. 1 is a block diagram of a data acquiring apparatus of an embodiment of this invention.

FIG. 1 is a block diagram of a data acquiring apparatus of this embodiment.

The data acquiring apparatus of this embodiment comprises a communication control portion 1 for communicating with a terminal 25 of a data supplier through a network N, a mail box 2 for temporary storing data from the network N, a mail box processor 3 for controlling reading a portion of data stored in the mail box 2, a filing unit 4 for storing data from the mail box 2, an enciphering processor 5 for effecting an enciphering processing to the data from the mail box 2 and supplies the enciphered data to the filing unit 4, a data scraping processor 6 for scraping the data in the mail box 2 or the filing unit 4, an accessing processor 7 for accessing to and reading desired data in the filing unit 4 and providing the desired data to a user after decoding, and a display unit 8, having a display 8a, a keyboard 8b, and a speaker 8c, for displaying the desired visual data and data for operation, for example, guidance data, or reproducing a sound, and receiving commands from the user via the keyboard 8b.

The mail box 2 and the filing unit 4 have memories having capacities more than one gigabytes. The mail box processor 3, the enciphering processor 5, the data scraping processor 6 comprise microprocessors which execute respective processings such as reading data from the mail box, enciphering data at a high speed.

Figure 2:
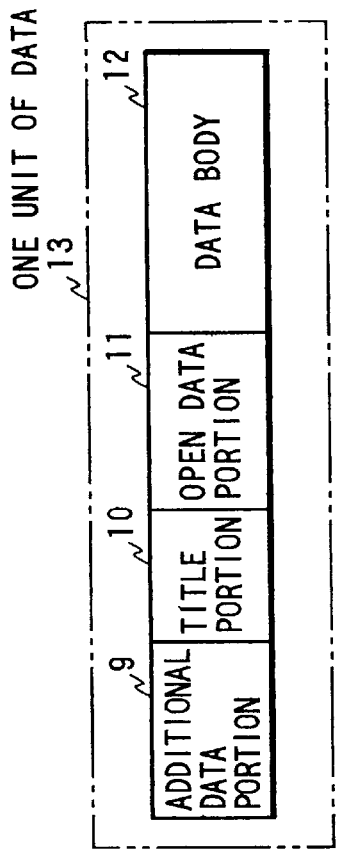
FIG. 2 is an illustration of a format of one unit of data per one communication of this embodiment.

FIG. 2 is an illustration of a format of one unit of data 13 per one communication of this embodiment. The unit 25 of data (block of data) 13 is transmitted from the terminal of the data supplier through the network N and is received and stored in the mail box 2. The one unit of data 13 includes a data body 12 to be provided to the user, a title portion 10 including title data of the data body, an open data portion 11 including data of a summary or a guidance of the data body 12, a kind of the data body 12, and a guidance for the data body 12, and, an additional data portion 9 including control data for controlling the data body 12, such as an amount of data body 12, mode data (sound data, still picture data, moving data picture, or character data, and conditional data for using the data body).

The data body 12 includes various kinds of data such as a cinema, one or more songs, a set of game including a program and data, a novel, or a story, a newspaper, or a magazine which includes character data, image data, or video data.

The mail box processor 3 has a program capable of accessing to the unit of data 13 other than the data body 12, that is, the title portion 10, the open data portion 11, and the additional data portion 9.

An operation will be described.

The data supplied or distributed from the terminal 25 of the data supplier through the network N is received by the communication control portion 1 and temporary stored in the mail box 2. The mail box 2 stores a plurality of units of data of which the number is determined by its capacity. The user actuates the mail box processor 3 by operating the keyboard 8b to check data distributed and stored in the mail box 2. The mail box processor 3 selects one unit of data in accordance with the command by the user and reads the additional data portion 9 of the selected unit of data 13, further reads the data in the title portion 10 and the open data portion 11 in accordance with the data in the additional data portion 9, and displays the data in the title portion 10 and the open data portion 11 on the display 8a. In this condition, the mail box processor 3 cannot access to the data body 12, that is, the mail box processor 3 is not allowed to access to the data body 12.

The user knows the kinds of the data body and the summary or a guidance from the displayed data in the title portion 10 and the open data portion 11 and decides whether or not that unit of data is acquired, that is, is stored in the filing apparatus 4. If the user desires to access to the data body 12, it is necessary to transfer the unit of data 13 to the filing unit 4 because the user is not allowed to access to the data body 12 while the unit of data 13 exists in the mail box 2.

When the user selects desired data to transfer the desired data to the filing unit 4, the mail box processor 3 actuates the enciphering processor 5 to transfer the desired data to the filing unit 4. The enciphering processor 5 enciphers the data body 12 with an enciphering method determined by a user identification code for identifying the user, that is, effects a scrambling processing and stores the enciphered data 18 in the filing unit 4. During this, the enciphering processor 5 attaches a user ID portion 15 including data of the user ID, a storing condition data portion 16, and a utilizing condition data portion 17 including data of the user's name, a utilizing date, and utilizing times to the data 13 including additional data portion 9, the title portion 10, the open data portion 11, and the enciphered data body 14 to form an enciphered unit data 18 which is stored in the filing unit 4. As mentioned, the enciphered unit of data is subjected to the enciphering processing using a cipher key (key data) corresponding to the user, so that the enciphered unit data 18 is processed to make it impossible to be used by a person other than the user.

Figure 3:
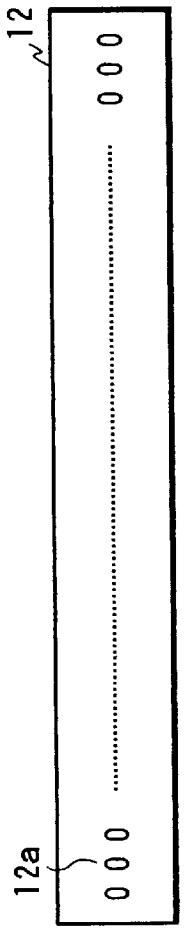
FIG. 3 is an illustration of a format of the enciphered data of this embodiment.

FIG. 3 is an illustration of a format of the enciphered data of this embodiment. The enciphered unit data 18 includes the additional data portion 9, the title portion 10, and the open data portion 11 storing the data which is the same as data of the corresponding portions of the unit data 13 in the mail box 3, the user ID portion 15 including the user ID data, the storing data portion 16 including data representing a stored condition of the enciphered data body 14 in the filing unit 4, and the utilizing condition data portion 17 including data representing a condition of the data actually utilized by the user after the enciphered data body 14 has been stored in the filing unit 4.

After the unit of data 13 is enciphered and stored in the filing unit 4 as the enciphered unit data 18, the unit data 13 is erased and the enciphering processor 5 informs the data supplier that the data has been stored in the filing unit 4 through the communication control portion 1. An address of the data supplier is stored in the addition data portion 9. After transmission of this notice of data filing 21a, a data keeping responsibility of the user to the data supplier is developed.

When the user decides that the data is useless, the user selects data scraping using the display unit 8. In response to this, the mail box processor 3 actuates the data scraping processor 6 to erase the data in the mail box 2 to be erased and transmits a notice of the data scraping 22 to the data supplier through the communication control portion 1. After transmission of this notice of data scraping 22, the data keeping responsibility of the user to the data supplier and a right of utilizing the data disappear.

While the enciphered unit of data 18 exists in the filing unit 4, the user can utilize this enciphered unit data using the access processor 7. When the user actuates the accessing processor 7, the accessing processor 7 reads the desired data from the filing unit 4 and decodes the enciphered data body 14 from the data in the additional data portion 9 and the user ID portion 15 and provides the decoded desired data to the user through the display unit 8. During this, the accessing processor 7 stores the date and time of accessing to the desired data, the user name, the title, and the count of utilizing the desired data and transmits a notice of utilizing 23 the data to the data supplier. In response to the notice of utilizing 23, the supplier effects an accounting processing.

If the user desires to scrap the data stored in the filing unit 4, the user actuates the data scraping processor 6 through the access processor 7 to erase the data in the filing unit 4. After completion of erasing, the accessing processor 7 transmits the notice of the data scraping 24 to the data supplier of which data is stored in the additional data portion 9.

As mentioned, the data supplier can distributes data without permission by the users and the user can check the distributed data freely because the user accesses to the summary of the data or the like without accessing the data body 12 and if necessary, the user can use the data immediately or can scrap the distributed data if the distributed data unnecessary. Moreover, the data body 12 is subjected to the enciphering processing which is different every user, so that a person other than the specified user cannot utilize the enciphered data and though the storing medium in the filing unit 4 is removable, the data cannot be used by a person other than the specified user. Then, the copyright is also protected.

That is, as shown in FIG. 1, the filing unit 4 includes a reading and writing unit 4b for reading data on a removable recording medium 4a and for writing data on the removable recording medium 4a. However, a fixed recording medium can be used also.

The distributed data includes the open data portion 11, so that the data supplier can publicity appeal the content of the data to the users and the user can readily check the content of the distributed data. Moreover the distributed data includes the additional data portion including data for controlling the data body 12 and the address of the supplier or the like which is used for transmitting the notices.

Because the notice of utilizing, the notice of data scraping are transmitted to the data supplier, so that the data supplier can acquire and record the data of utilizing every distributed data and can readily perform the accounting processing.

As mentioned, the data acquiring apparatus of this invention comprises: the display 8a; the keyboard (input portion) 8b; the communication control portion 1, coupled to a network N, for controlling communication with the network; a mail box 2 for storing at least a block of data 13 from the network N via the communication control portion 1; the enciphering processor 5 for enciphering the block of data from the mail box; the mail box processor 3 for displaying a portion 9, 10, 11 of the block of data from the mail box 2 on the display 8a in response to a first request 8d via the keyboard 8b, for controlling the mail box 2, supplying the block of data 13 to the enciphering processor 5 in response to a second request 8e from the keyboard 8b and operating the enciphering processor 5 to encipher the block of data 13 from the mail box processor 3; the filing unit 4 responsive to the enciphering processor 5 for storing the block of data from the enciphering processor 5; and the accessing processor 7 for decoding and displaying the block of data from the filing unit 4 on the display 8a in response to a third request 8f from the keyboard 8b to provide the decoded block of data to a user.

In this data acquiring apparatus, the portion of block of data includes the title portion 10 and the open data portion 11, the remaining portion of the block of data includes the data body 12 to be provided to the user and the control data portion( additional data portion) 9, the title portion represents a title of the data body 12, the open data portion includes information relating to the data body 12, and the mail box processor 3 controls the mail box 2 in accordance with the control data portion 9. In this case, the mail box processor 3 is inhibited from accessing to the data body and only the accessing processor 7 is permitted to access to the data body of the block of data in the filing unit 4.

Figure 4:
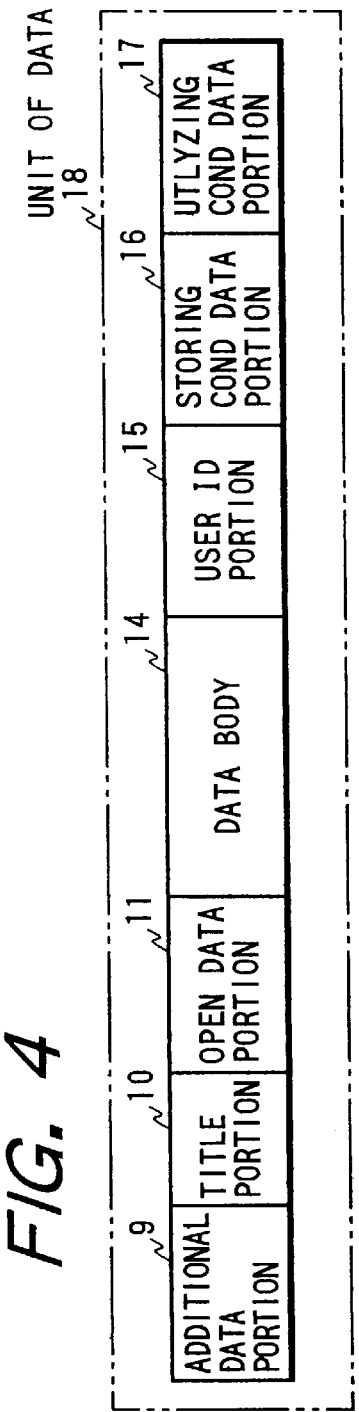
FIG. 4 is an illustration of this embodiment showing data in the data body.

FIG. 4 is an illustration of this embodiment showing data in the data body.

This data acquiring apparatus further comprises the data scraping processor 6 for scraping the block of data in the mail box 2, the mail box processor 3 operates the data scraping processor 6 to scrap the block of data in the mail box 2 in response to a request 8g and generating and transmitting a notice 22 indicating that the block of data in the mail box 2 has been scraped to the terminal 25 of the data supplier which transmitted the block of data.

This data scraping processor 6 scraps the block of data in the filing unit 4, the accessing processor 7 operates the data scraping processor 6 to scraping the block of data in the filing unit 4 in response to a request 8h, and the accessing processor 7 generates and transmits the notice 23 indicating that the block of data in the filing unit has been scraped to a data supplier which transmitted the block of data in response to the fourth request. In this case, the data scraping processor 6 stores predetermined data 12a over the block of data in the filing unit 4 as shown in FIG. 4 to scrap the data of block in order to prevent the block of data from being utilized again and the data accessing processor 7 transmits the notice 23 when the data scraping processor 6 has stored the predetermined data over the block of data in the filing unit. The data block in the mail box 2 is erased similarly. Moreover, the accessing processor 7 generates record data 26 indicating that the block of data in the filing unit has been scraped and informs of the record data to the data supplier which transmitted the block of data via the network N in response to a request 7a or 7a' from the data supplier.

In the data acquiring apparatus, the enciphering processor 5 enciphers the block of data 13 through an enciphering processing which is determined in accordance with key data 8i and identification data 8j of the user inputted from the keyboard 8b to prevent the block of data from being utilized by another person.

In the data acquiring apparatus, the enciphering processor 5 generates and transmits the notice 21a indicating that the block of data has stored in the filing unit 4 to the data supplier, which transmitted the block of data, when the enciphering processor 5 enciphers the block of data.

In the data acquiring apparatus, the accessing processor 7 decodes the block of data from the filing unit 4 through a decoding processing which is determined in accordance with second key data 8k and second identification data 81 inputted from the keyboard 8b and the decoding processing is an inversion of the enciphering processing when the key data 8i and the identification data 8j agree with the second key data 8k and second identification data 81 respectively.

In the data acquiring apparatus, the accessing processor 7 displays the decoded block of data on the display and generates and transmits the notice 24 indicating that the block of data from the filing unit 4 is utilized to a data supplier, which transmitted the block of data, when the accessing processor 7 decodes the block of data.

In the data acquiring apparatus, the accessing processor 7 displays the decoded block of data on the display and generates and stores historic data 17 indicating that the block of data in the filing unit 4 is utilized in the filing unit 4 with a relation to the block of data in the filing unit 4 when the accessing processor 7 decodes the block of data. In this case, the accessing processor 7 reads and transmits the historic data 17 from the filing unit 4 to the data supplier which transmitted the block of data via the network N in response to the request 7a or 7a' from the data supplier via the network and the communication control portion.

In the data acquiring apparatus, the filing unit 4 may comprise a storing portion 4b for storing the block of data from the enciphering processor 5 on a removable recording medium 4a and a reading portion 4b for reading the block of data from the removable recording medium 4a.

What is claimed is:

1. A data acquiring apparatus comprising:

a display (8a);

input means (8b);

communication control means (1), coupled to a network (N), for controlling communication with said network;

mail box means (2) for storing at least a block of data (13) from said network via said communication control means;

enciphering means (5) for enciphering said block of data from said mail box;

mail box control means (3) for displaying a portion (9, 10, 11) of said block of data from said mail box means on said display in response to a first request (8d) via said input means, for controlling said mail box, supplying said block of data (13) to said enciphering means in response to a second request (8e) from said input means and operating said enciphering means to encipher said block of data 13 from said mail block;

filing means (4) responsive to said enciphering means for storing said block of data from said enciphering means; and decoding means (7) for decoding and displaying said block of data from said filing means on said display means in response to a third request (8f) from said input means to provide the decoded block of data to a user.

2. A data acquiring apparatus as claimed in claim 1, wherein said portion of block of data includes a title portion (10) and an open data portion (11), the remaining portion of said block of data includes a data body (12) to be provided to said user and a control data portion (9), said title portion represents a title of said data body, said open data portion includes information relating to said data body, and said mail box control means controls said mail box means in accordance with said control data portion.

3. A data acquiring apparatus as claimed in claim 2, wherein said mail box control means is inhibited from accessing to said data body.

4. A data acquiring apparatus as claimed in claim 1, further comprising data scraping means (6) for scraping said block of data in said mail box, said mail box control means operating said data scraping means to scrap said block of data in said mail box in response to a fourth request (8g) and generating and transmitting a notice (22) indicating that said block of data in said mail box has been scraped to a data supplier (25) which transmitted said block of data.

5. A data acquiring apparatus as claimed in claim 1, further comprising data scraping means (6) for scraping said block of data in said filing means, said decoding means operates said data scraping means (6) to scraping said block of data in said filing means in response to a fourth request (8h) and said decoding means generates and transmits a notice (23) indicating that said block of data in said filing means has been scraped to a data supplier which transmitted said block of data in response to said fourth request.

6. A data acquiring apparatus as claimed in claim 5, wherein said data scraping means stores predetermined data (12a) over said block of data in said filing means to scrap said data of block in order to prevent said block of data from being utilized again and said data decoding means transmits said notice (23) when said data scraping means has stored said predetermined data over said block of data in said filing means.

7. A data acquiring apparatus as claimed in claim 1, wherein said enciphering means enciphers said block of data through an enciphering processing which is determined in accordance with key data (8i) and identification data (8j) of said user inputted from said input means to prevent said block of data from being utilized by another person.

8. A data acquiring apparatus as claimed in claim 1, wherein said enciphering means generates and transmits a notice (21a) indicating that said block of data has stored in said filing means to a data supplier, which transmitted said block of data, when said enciphering means enciphers said block of data.

9. A data acquiring apparatus as claimed in claim 1, wherein said decoding means decodes said block of data from said filing means through a decoding processing which is determined in accordance with second key data (8k) and second identification data (8i) inputted from said input means and said decoding processing is an inversion of said enciphering processing when said key data and said identification data agree with said second key data and second identification data respectively.

10. A data acquiring apparatus as claimed in claim 1, wherein said decoding means displays the decoded block of data on said display and generates and transmits a notice (24) indicating that said block of data from said filing means is utilized to a data supplier, which transmitted said block of data, when said decoding means decodes said block of data.

11. A data acquiring apparatus as claimed in claim 1, wherein said decoding means displays the decoded block of data on said display and generates and stores historic data (17) indicating that said block of data in said filing means is utilized in said filing means with a relation to said block of data in said filing means when said decoding means decode said block of data.

12. A data acquiring apparatus as claimed in claim 2, wherein only said decoding means is permitted to access to said data body of said block of data in said filing means.

13. A data acquiring apparatus as claimed in claim 11, wherein said decoding means reads and transmits said historic data (17) from said filing means to a data supplier which transmitted said block of data via said network in response to a request (7a, 7a') from said data supplier via said network and said communication control means.

14. A data acquiring apparatus as claimed in claim 5, wherein said decoding means generates record data (26) indicating that said block of data in said filing means has been scraped and informs of said record data to a data supplier which transmitted said block of data via said network in response to a sixth request from said data supplier.

15. A data acquiring apparatus as claimed in claim 1, wherein said filing means comprises storing means (4b) for storing said block of data from said said enciphering means on a removable recording medium (4a) and reading means for reading said block of data from said removable recording medium.

* * * * *